(12) United States Patent
Jansen et al.

(10) Patent No.: US 8,501,851 B2
(45) Date of Patent: Aug. 6, 2013

(54) PRE-ACCELERATED RESIN COMPOSITION

(75) Inventors: Johan Franz Gradus Antonius Jansen, Geleen (NL); Ronald Ivo Kraeger, Baarn (NL)

(73) Assignee: DSM IP Assets B.V., Heerlen (NL)

( * ) Notice: Subject to any disclaimer, the term of this patent is extended or adjusted under 35 U.S.C. 154(b) by 586 days.

(21) Appl. No.: 12/529,951

(22) PCT Filed: Mar. 3, 2008

(86) PCT No.: PCT/EP2008/001668
§ 371 (c)(1),
(2), (4) Date: Nov. 10, 2009

(87) PCT Pub. No.: WO2008/107146
PCT Pub. Date: Sep. 12, 2008

(65) Prior Publication Data
US 2010/0087601 A1    Apr. 8, 2010

(30) Foreign Application Priority Data
Mar. 6, 2007 (EP) .................................. 07004549

(51) Int. Cl.
C08K 5/098 (2006.01)
C08K 5/13 (2006.01)
C08L 51/08 (2006.01)
C08L 67/06 (2006.01)

(52) U.S. Cl.
USPC ........... 524/291; 524/337; 524/413; 524/563; 524/604

(58) Field of Classification Search
USPC .................. 524/291, 337, 413, 563, 604
See application file for complete search history.

(56) References Cited

FOREIGN PATENT DOCUMENTS

| CN | 1 313 369 | 9/2001 |
| CN | 1313369 A * | 9/2001 |
| GB | 586 397 | 3/1947 |
| GB | 629 093 | 9/1949 |
| GB | 637 464 | 5/1950 |
| GB | 629093 B * | 5/1950 |
| GB | 1 465 653 | 2/1977 |
| JP | 1 254722 | 10/1989 |

OTHER PUBLICATIONS

Database CA [Online], "Solventless non-toxic two-component unsaturated polyester coating materials", *Chemical Abstracts Service*, XP002482152, 2001.
Database WPI Week 198947, Derwent Publications Ltd., 1989-343285, XP002482176.
Database CA [Online], "Curing acceleration of radical-curable resins by aliphatic acetoacetamides", *Chemical Abstracts Service*, XP002482175, 1989.

* cited by examiner

*Primary Examiner* — Kelechi Egwim
(74) *Attorney, Agent, or Firm* — Nixon & Vanderhye P.C.

(57) ABSTRACT

The present invention relates to a pre-accelerated resin composition comprising an unsaturated polyester resin and/or a vinyl ester resin, wherein the composition further comprises a. a copper salt, and b. a compound according to formula (1) in which R can be selected from H, optionally substituted $C_1$-$C_{20}$ alkyl, optionally substituted $C_6$-$C_{20}$ aryl, and wherein the copper is present in an amount of more than 0.1 mmol/kg resin.

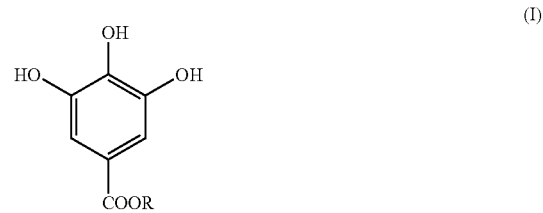

(I)

19 Claims, No Drawings

PRE-ACCELERATED RESIN COMPOSITION

This application is the U.S. national phase of International Application No. PCT/EP2008/001668 filed 3 Mar. 2008 which designated the U.S, and claims priority to European Patent Application No. 07004549.7 filed 6 Mar. 2007, the entire contents of each of which are hereby incorporated by reference.

The invention relates a pre-accelerated resin composition comprising an unsaturated polyester resin and/or a vinyl ester resin. The present invention also relates to two-component compositions containing a first component A and a second component B; the first component containing an unsaturated polyester resin and/or vinyl ester resin and the second component containing a peroxide. In particular, the present invention relates to two-component unsaturated polyester resin and/or vinyl ester resin compositions for structural parts.

The present invention further also relates to objects and structural parts prepared from such two-component compositions. The present invention finally also relates to a process for curing such two-component compositions.

As used herein, the term "two-component system" refers to systems where two separate components (A and B) are being spatially separated from each other, for instance in separate cartridges or the like, and is intended to include any system wherein each of such two separate components (A and B) may contain further separate components. The components are combined at the time the system is used.

As meant herein, objects and structural parts are considered to have a thickness of at least 0.5 mm and appropriate mechanical properties. The term "objects and structural parts" as meant herein also includes cured resin compositions as are used in the field of chemical anchoring, construction, roofing, flooring, windmill blades, containers, tanks, pipes, automotive parts, boats, etc.

All polyester resins, by their nature, undergo some changes over time from their production till their actual curing. One of the characteristics where such changes become visible is the gel-time drift. The state of the art unsaturated polyester resin systems generally are being cured by means of initiation systems. In general, such unsaturated polyester resin systems are cured under the influence of peroxides and are accelerated (often even pre-accelerated) by the presence of metal compounds, especially cobalt salts, as accelerators. Cobalt naphthenate and cobalt octanoate are the most widely used accelerators. In addition to accelerators, the polyester resins usually also contain inhibitors for ensuring that the resin systems do not gellify prematurely (i.e. that they have a good storage stability). Furthermore, inhibitors, especially phenolic inhibitors, are being used to ensure that the resin systems have an appropriate gel time and/or for adjusting the gel-time value of the resin system to an even more suitable value.

Most commonly, in the state of the art, polymerization initiation of unsaturated polyester resins, etc. by redox reactions involving peroxides, is accelerated or pre-accelerated by a cobalt compound in combination with another accelerator.

It has now surprisingly been found that a soluble copper salt in combination with a compound according to formula 1

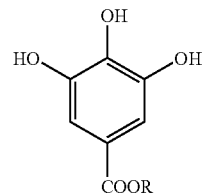

(1)

in which R can be selected from H, a $C_1$-$C_{20}$ alkyl group that is optionally substituted, a $C_6$-$C_{20}$ aryl group that is optionally substituted, acts as an accelerator for the peroxide curing of an unsaturated polyester resin and/or vinyl ester resin. Preferably, R is H, a $C_1$-$C_{20}$ alkyl group or a $C_6$-$C_{20}$ aryl group. More preferably, R is H or a $C_1$-$C_{20}$ alkyl group.

This is very surprising considering the fact that both copper as well as compounds according to formula 1 are well known as stabilizers/inhibitors. For instance, U.S. Pat. No. 5,861,466 mentions copper as shelf life stabilizer, U.S. Pat. No. 4,524,177 mentions copper as stabilizer in the same list as phenolic compounds and GB-A-834286 even describes that copper enhances the inhibiting effect of phenolic inhibitors. Compounds according to formula (I) are also known as phenolic inhibitors, see for instance GB-A-629093, GB-A-898776 and U.S. Pat. No. 4,094,835.

Surprisingly it has been found that with the resin compositions according to the invention, resin systems can be obtained with high curing efficiency, such as short gel time, short peak time, high peak temperature and/or low temperature curing (temperature between −10 and 40° C.; so-called cold-curing). In the curing of unsaturated polyester resins or vinyl esters, gel time is a very important characteristic of the curing properties. In addition also the time from reaching the gel time to reaching peak temperature, and the level of the peak temperature (higher peak temperature generally results in better curing) are important.

An additional advantage of the present invention is that the gel-time drift can be reduced compared to when a cobalt compound is used as accelerator.

As meant herein the term gel-time drift (for a specifically selected period of time, for instance 30 or 60 days) reflects the phenomenon, that—when curing is performed at another point of time than at the reference standard moment for curing, for instance 24 hours after preparation of the resin—the gel time observed is different from that at the point of reference. For unsaturated polyester resins, as can generally be cured under the influence of peroxides as second component, gel time represents the time lapsed in the curing phase of the resin to increase in temperature from 25° C. to 35° C. Normally this corresponds to the time the fluidity (or viscosity) of the resin is still in a range where the resin can be handled easily. In applications having a long resin injection period, such as for instance closed mould operations, this time period is very important to be known. The lower the gel-time drift is, the better predictable the behavior of the resin (and the resulting properties of the cured material) will be.

Gel time drift (hereinafter: "Gtd") can be expressed in a formula as follows:

$$\text{Gtd} = (T_{25 \to 35° C. \text{ at } y\text{-days}} - T_{25\text{-}35° C. \text{ after mixing}}) / T_{25 \to 35° C. \text{ after mixing}} \times 100\%$$ (formula 1)

In this formula $T_{25 \to 35}°$ C. (which also might be represented by $T_{gel}$) represents, as mentioned above, the time lapsed in the curing phase of the resin to increase in temperature from 25° C. to 35° C. The additional reference to "at y days" shows after how many days of preparing the resin the addition of the second component is effected.

The unsaturated polyester resin or vinyl ester resin as is comprised in the resin compositions according to the present invention, may suitably be selected from the unsaturated polyester resins or vinyl ester resin as are known to the skilled man. The unsaturated polyester can be manufactured by polycondensation of at least a polyol and an unsaturated diacid. Examples of unsaturated diacids are for example maleic acid, maleic anhydride and fumaric acid. The polycondensation may also be effected in the presence of saturated aliphatic diacids or anhydrides, like for example oxalic acid, succinic acid, adipic acid, sebacic acid and/or in the presence of aromatic saturated diacids or anhydrides like for example phthalic acid or anhydride and isophthalic acid. In the polycondenstation is further used a di- or polyfunctional alcohol, such as for example 1,2-propylene glycol, ethylene glycol, diethylene glycol, triethylene glycol, 1,3-propylene glycol, dipropylene glycol, tripropylene glycol, neopentyl glycol, hydrogenated bisphenol-A or ethoxylated/propoxylated bisphenol A. Examples of suitable unsaturated polyester or vinyl ester resins to be used as basic resin systems in the resins of the present invention are, subdivided in the categories as classified by Malik et al., cited above.

(1) Ortho-resins: these are based on phthalic anhydride, maleic anhydride, or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A. Commonly the ones derived from 1,2-propylene glycol are used in combination with a reactive diluent such as styrene.

(2) Iso-resins: these are prepared from isophthalic acid, maleic anhydride or fumaric acid, and glycols. These resins may contain higher proportions of reactive diluent than the ortho resins.

(3) Bisphenol-A-fumarates: these are based on ethoxylated bisphenol-A and fumaric acid.

(4) Chlorendics: are resins prepared from chlorine/bromine containing anhydrides or phenols in the preparation of the UP resins.

(5) Vinyl ester resins: these are resins, which are mostly used because of their hydrolytic resistance and excellent mechanical properties, as well as for their low styrene emission, having unsaturated sites only in the terminal position. Vinyl ester resins are obtained by reaction of epoxy resins (e.g. diglycidyl ether of bisphenol-A, epoxies of the phenol-novolac type, or epoxies based on tetrabromobisphenol-A) with (meth)acrylic acid. Instead of (meth) acrylic acid also (meth)acrylamide may be used.

Besides these classes of resins also so-called dicyclopentadiene (DCPD) resins can be distinguished.

All of these resins, as can suitably be used in the context of the present invention, may be modified according to methods known to the skilled man, e.g. for achieving lower acid number, hydroxyl number or anhydride number, or for becoming more flexible due to insertion of flexible units in the backbone, etc. The class of DCPD-resins is obtained either by modification of any of the above resin types by Diels-Alder reaction with cyclopentadiene, or they are obtained alternatively by first reacting maleic acid with dicyclopentadiene, followed by the resin manufacture as shown above.

Accordingly, the unsaturated polyester resins or vinyl ester resins used in the present invention may contain solvents. The solvents may be inert to the resin system or may be reactive therewith during the curing step. Reactive solvents are particularly preferred. Examples of suitable reactive solvents are styrene, α-methylstyrene, (meth)acrylates, N-vinylpyrrolidone and N-vinylcaprolactam.

The unsaturated polyester resins and vinyl ester resins as are being used in the context of the present invention may be any type of such resins, but preferably are chosen from the group of DCPD-resins, iso-phthalic resins and ortho-phthalic resins and vinyl ester resins. More detailed examples of resins belonging to such groups of resins have been shown in the foregoing part of the specification. More preferably, the resin is an unsaturated polyester resin preferably chosen from the group of DCPD-resins, iso-phthalic resins and ortho-phthalic resins.

The resin composition preferably has an acid value in the range of from 0.001-300 mg KOH/g of resin composition. Preferably, the molecular weight of the unsaturated polyester resin or vinyl ester resin is in the range of from 500 to 200.000 g/mole.

The resin composition generally contains less than 5 wt. % water.

R in formula (I) can be selected from H; optionally substituted $C_1$-$C_{20}$ alkyl, such as for example methyl, ethyl, n-propyl and its isomers, n-butyl and its isomers, 2-ethylhexyl and n-octyl; and from optionally substituted $C_6$-$C_{20}$ aryl. Non-limiting examples of compounds according to formula (I) are gallic acid, propylgallate, methylgallate, ethylgallate and isopropylgallate.

The copper salt may be any copper salt that is soluble in the primary resin system at room temperature. Preferably the copper salt is a copper carboxylate. It will be clear that, instead of a single copper salt, also a mixture of copper salts can be used.

The term "primary resin system" as used herein is understood to mean the total weight of the resin composition, but excluding any fillers as may be used when applying the resin system for its intended uses. The primary resin system therefore consists of the unsaturated polyester resin or vinyl ester resin, any additives present therein (except for the peroxide component that is to be added shortly before the curing) soluble in the resin, such as accelerators, promoters, inhibitors, low-profile agents, colorants (dyes), thixotropic agents, release agents etc., as well as styrene and/or other solvents as may usually be present therein. The amount of additives soluble in the resin usually may be as from 1 to 25 wt. % of the primary resin system; the amount of styrene and/or other solvent may be as large as up to 50 wt. % of the primary resin system. The primary resin system, however, explicitly does not include compounds not being soluble therein, such as fillers (e.g. glass or carbon fibers), talc, clay, solid pigments (such as, for instance, titanium dioxide The resin composition according to the present invention comprises copper salt and compounds according to formula 1 in such an amount that an effective curing takes place. This means that the copper is present in an amount of more than 0.1 mmol/kg resin, more preferably more than 1 mmol/kg resin, even more preferably more than 2 mmol/kg resin. As too high amounts of copper do not further contribute to an efficient curing the amount is preferably less than 1000 mmol/kg resin, preferably less than 200 mmol/kg resin, most preferably less than 100 mmol/kg resin.

The compound according to formula 1 is preferably present in an amount of at least 0.1 mmol/kg resin, more preferably more than 1 mmol/kg resin, even more preferably more than 2 mmol/kg resin. As too high amount of compounds according to formula 1 do not further contribute to an efficient curing the amount is preferably less than 1000 mmol/kg resin, more preferably less than 200 mmol/kg resin and most preferably less than 100 mmol/kg resin.

The molar ratio between the copper salt and the compound according to formula 1 is preferably between 30:1 to 1:100 more preferably between 15:1 to 1:20 and most preferably 2:1 to 1:10.

The inventors have further found that the curing can be performed even more efficient, such as shown by shorter gel time, shorter peak time, higher peak temperature and/or lower temperature curing, when the resin composition further comprises a potassium compound. With respect to solubility in the primary resin system the potassium compound is preferably a potassium carboxylate.

The inventors also have further found that the curing of the resin composition according to the invention and in particular the curing of unsaturated polyester resin compositions according to the invention can be performed even more efficient when the resin composition further comprises an acetoacetamide compound having the following formula:

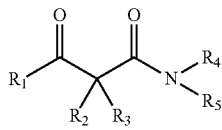

(2)

whereby
$R^1, R^2, R^3, R^4$ and $R^5$ each individually may represent hydrogen (H), or a $C_1$-$C_{20}$ alkyl, $C_6$-$C_{20}$ aryl, alkylaryl or arylalkyl group, that each optionally may contain one or more heteroatoms (e.g. oxygen, phosphor, nitrogen or sulphur atoms) and/or substituents; a ring may be present between $R^1$ and $R^2$, $R^2$ and $R^3$, $R^3$ and $R^5$, and/or between $R^4$ and $R^5$;
$R^4$ and/or $R^5$ may be part of a polymer chain or may be attached to a polymer chain. Preferably, $R^1$ is a $C_1$-$C_{20}$ alkyl group; more preferably, $R^1$ is a methyl group. Preferably, at least one of $R^2$ and $R^3$ is hydrogen. Preferably, $R^4$ and $R^5$ each individually represents hydrogen, methyl or ethyl or $R^4$ is hydrogen and $R^5$ is an alkylaryl or arylalkyl group. Furthermore, using an acetoacetamide compound may result in a further decrease of the gel time drift.

Preferably, the amount of the acetoacetamide compound is from 0.05 to 5% by weight, calculated on the total weight of the primary resin system. More preferably, amount of the acetoacetamide compound is from 0.25 to 2% by weight.

Regarding the fact that copper acts as inhibitor for cobalt based pre-accelerated resin compositions (see U.S. Pat. No. 5,861,466) the amount of cobalt in the resin composition according to the invention is preferably less than 1 mmol Co/kg primary resin system, more preferably less than 0.1 mmol/kg primary resin system, more preferably less than 0.01 mmol/kg primary resin system and most preferably the resin composition according to the invention contains no cobalt. Moreover, for environmental reasons, the presence of cobalt in the resin composition according to the invention is less preferred.

The resin compositions according to the invention preferably further comprises one or more reactive diluents, preferably in an amount of at least 5 weight % and generally at most 80 wt. %. Such reactive diluents are especially relevant for reducing the viscosity of the resin in order to improve the resin handling properties, particularly for being used in techniques like vacuum injection, etc. However, the amount of such reactive diluent in the resin composition according to the invention is not critical. Examples of suitable reactive diluents are styrene, vinyl toluene, α-methyl styrene, tert butyl styrene, methyl methacrylate (MMA), hydroxyethyl methacrylate (HEMA), hydroxypropyl methacrylate (HPMA), vinyl ethers, vinyl esters, butanediol dimethacrylate (BDDMA), triethylene glycol dimethacrylate (TEGDMA), trimethylolpropane trimethacryate (TMPTMA), phenoxyethyl methacrylate (PEMA), N-vinylpyrrolidone and N-vinylcaprolactam. Preferably, the reactive diluent is a methacrylate and/or styrene.

In a further preferred embodiment of the present invention, the resin composition also contains one or more inhibitors.

More preferably, the resin compositions also contains an inhibitor, preferably chosen from the group of phenolic compounds, stable radicals like galvinoxyl and N-oxyl based compounds, catechols and/or phenothiazines.

The amount of inhibitor as used in the context of the present invention, may, however, vary within rather wide ranges, and may be chosen as a first indication of the gel time as is desired to be achieved. Preferably, the amount of phenolic inhibitor is from about 0.001 to 35 mmol per kg of resin, and more preferably it amounts to more than 0.01, most preferably more than 0.1 mmol per kg of resin. The skilled man quite easily can assess, in dependence of the type of inhibitor selected, which amount thereof leads to good results according to the invention.

Suitable examples of inhibitors that can be used in the resin compositions according to the invention are, for instance, 2-methoxyphenol, 4-methoxyphenol, 2,6-di-t-butyl-4-methylphenol, 2,6-di-t-butylphenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), galvinoxyl, 1-oxyl-2,2,5,5-tetramethylpyrrolidine, 1-oxyl-2,2,5,5-tetramethyl-3-carboxylpyrrolidine (also called 3-carboxy-PROXYL), aluminium-N-nitrosophenyl hydroxylamine, diethylhydroxylamine, phenothiazine and/or derivatives or combinations of any of these compounds.

The present invention further relates to a two-component composition comprising a first component A and a second component B, wherein the first component being a resin composition as described above and the second component comprises a peroxide compound.

The peroxides used for the B component can be any peroxide known to the skilled man. Such peroxides include organic and inorganic peroxides, whether solid or liquid; also hydrogen peroxide may be applied. Examples of suitable peroxides are, for instance, peroxy carbonates (of the formula —OC(O)O—), peroxyesters (of the formula —C(O)OO—), diacylperoxides (of the formula —C(O)OOC(O)—), dialkylperoxides (of the formula —OO—), etc. The peroxides can also be oligomeric or polymeric in nature. An extensive series of examples of suitable peroxides can be found, for instance, in US 2002/0091214-A1, paragraph [0018]. The skilled man can easily obtain information about the peroxides and the precautions to be taken in handling the peroxides in the instructions as given by the peroxide producers.

Preferably, the peroxide is chosen from the group of organic peroxides. Examples of suitable organic peroxides are: tertiary alkyl hydroperoxides (such as, for instance, t-butyl hydroperoxide), other hydroperoxides (such as, for instance, cumene hydroperoxide), the special class of hydroperoxides formed by the group of ketone peroxides (perketones, being an addition product of hydrogen peroxide and a ketone, such as, for instance, methyl ethyl ketone peroxide and acetylacetone peroxide), peroxyesters or peracids (such as, for instance, t-butyl peresters, benzoyl peroxide, peracetates and perbenzoates, lauryl peroxide, including (di)peroxyesters), -perethers (such as, for instance, peroxy diethyl ether). Often the organic peroxides used as curing agent are tertiary peresters- or tertiary hydroperoxides, i.e. peroxy compounds having tertiary carbon atoms directly united to an —OO-acyl or —OOH group. Clearly also mixtures of these peroxides with other peroxides may be used in the context of the present invention. The peroxides may also be mixed peroxides, i.e. peroxides containing any two of different peroxygen-bearing moieties in one molecule).

Preferably, the peroxide used in the B component is selected from the group comprising hydroperoxides and peresters.

The present invention further relates to a process for radically curing a resin composition, wherein the curing is performed starting from a two-component composition as described above. Preferably, the curing is effected at a temperature in the range of from −20 to +200° C., preferably in the range of from −20 to +100° C., and most preferably in the range of −10 to +40° C. It has surprisingly been found that the radical curing of a two-component composition according to the invention can be effected essentially free of cobalt and even in the absence of cobalt. Essentially free of cobalt means that the cobalt concentration in the resin composition is less than 0.01 mmol cobalt per kg primary resin system.

The two component unsaturated polyester or vinyl ester resin compositions according to the present invention can be applied in all applications as are usual for such types of resins. In particular they can suitably used in closed mould applications, but they also can be applied in open mould applications. For closed mould applications it is especially important that the manufacturer of the closed mould products reliably can use the favorable polymerization characteristics of the two component resin system according to the invention. End segments where the two components unsaturated polyester resin or vinyl ester resin systems according to the present invention can be applied are also marine applications, chemical anchoring, roofing, construction, relining, pipes & tanks, flooring, windmill blades, etc. That is to say, the two component resin systems according to the invention can be used in all known uses of unsaturated polyester resins and vinyl ester resins.

Preferably the two component system according to the invention or the composition obtained by the process according to the invention is used in marine applications like boats, chemical anchoring, roofing, construction, relining, pipes & tanks, flooring, windmill blades, containers, tanks, pipes, automotive parts.

Finally, the present invention relates to objects or structural parts obtained from a two component composition as described above.

Experimental Part

The resins used for curing are commercially available products and in addition thereto also a resin—hereinafter referred to as Resin A—was specifically prepared on behalf of the inventors for being used in the tests.

Preparation of Resin A 184.8 g of propylene glycol (PG), 135.8 g of diethylene glycol (DEG), 216.1 g of phthalic anhydride (PAN), 172.8 g of maleic anhydride (MAN), and 0.075 g 2-t-butylhydroquinone were charged in a vessel equipped with a reflux condenser, a temperature measurement device and inert gas inlet. The mixture was heated slowly by usual methods to 205° C. At 205° C. the mixture was kept under reduced pressure until the acid value reached a value below 16 mg KOH/g resin and the falling ball viscosity at 100° C. was below 50 dPa·s. Then the vacuum was relieved with inert gas, and the mixture was cooled down to 130° C., and thereafter the solid UP resin so obtained was transferred to a mixture of 355 g of styrene and 0.07 g of mono-t-butyl-hydroquinone and was dissolved at a temperature below 80° C. The final resin viscosity reached at 23° C. was 640 mPa·s, and the Non Volatile Matter content was 64.5 wt. %.

MONITORING OF CURING

In most of the Examples and Comparative Examples presented hereinafter it is mentioned, that curing was monitored by means of standard gel time equipment. This is intended to mean that both the gel time ($T_{gel}$ or $T_{25\rightarrow 35° C.}$) and peak time ($T_{peak}$ or $T_{25\rightarrow peak}$) were determined by exotherm measurements according to the method of DIN 16945 when curing the resin with the peroxides as indicated in the Examples and Comparative Examples. The equipment used therefore was a Soform gel timer, with a Peakpro software package and National Instruments hardware; the waterbath and thermostat used were respectively Haake W26, and Haake DL30.

For some of the Examples and Comparative Examples also the gel-time drift (Gtd) was calculated. This was done on the basis of the gel times determined at different dates of curing according to formula 1:

$$Gtd = (T_{25\rightarrow 35° C.\ at\ y\text{-}days} - T_{25\rightarrow 35° C.\ after\ mixing}) / T_{25\rightarrow 35° C.\ after\ mixing} \times 100\% \quad \text{(formula 1)}$$

with "y" indicating the number of days after mixing.

Examples 1a-c and Comparative Experiments A-H

Formulations were prepared based on 90 g resin A, 10 g styrene 0.24 g Cu naphtenate solution (8% Cu in spirits, 3 mmol Cu/kg resin) and 0.5 mmol (5 mmol/kg resin) of various phenolic compounds. After stirring for 5 min the mixtures were cured at 25° C. using 3% Butanox M50 and the cure was monitored with the gel timer. The results are shown in table 1

TABLE 1

| Example or experiment | compound | $T_{gel}$ (min) | $T_{peak}$ (min) | Peak temperature (° C.) |
|---|---|---|---|---|
| 1a | Gallic acid | 19.9 | 47.3 | 112 |
| 1b | Propylgallate | 18.4 | 47.1 | 112 |
| A | 1,2,4-benzenetriol | >1600* | | |
| B | 1,3,5-benzentriol | >1600* | | |
| C | Catechol | >1600* | | |
| D | 1,3 benzenediol | >1600* | | |
| E | t-butyl catechol | >1600* | | |
| F | Phenol | >1600* | | |
| G | Hydroquinone | >1600* | | |
| H | None | >1600* | | |

*still liquid after 24 hrs

These experiments clearly demonstrate that only by using the combination according to the invention a good curing can be obtained.

Examples 2a-f

Formulations were prepared based on 90 g resin A, 10 g styrene, 0.8 g Cu naphtenate solution (10 mmol Cu/kg resin) and 0.5 mmol (5 mmol/kg resin) of gallic acid or propyl gallate compounds. After stirring for 5 min the mixtures were cured at 25° C. using 1-3% Butanox M50 and the cure was monitored with the gel timer. The results are shown in table 2

TABLE 2

| | compound | Butanox M50 (%) | $T_{gel}$ (min) | $T_{peak}$ (min) | Peak temperature (° C.) |
|---|---|---|---|---|---|
| 2a | Gallic acid | 1 | 11.6 | 26.1 | 75 |
| 2b | | 2 | 11.2 | 35.1 | 84 |
| 2c | | 3 | 12.5 | 31.9 | 107 |
| 2d | propylgallate | 1 | 16 | 35.8 | 63 |
| 2e | | 2 | 10.1 | 32.6 | 86 |
| 2f | | 3 | 8.5 | 30.4 | 103 |

These results illustrate that the curing can be tuned using different amounts of peroxide Example 3a-i Formulations were prepared based on 90 g resin A, 10 g styrene, 0.24 g Cu naphtenate solution (3 mmol Cu/kg resin) and 1 mmol (10 mmol/kg resin) of gallic acid or propyl gallate compounds. After stirring for 5 min the mixtures were cured at 25° C. using 3% of various peroxides and the cure was monitored with the gel timer. The results are shown in table 3

TABLE 3

| | compound | peroxide | $T_{gel}$ (min) | $T_{peak}$ (min) | Peak temperature (° C.) |
|---|---|---|---|---|---|
| 3a | Gallic acid | Butanox M50 | 19 | 51 | 60 |
| 3b | | Trigonox 21 | 14.1 | 27.3 | 150 |
| 3c | | Trigonox C | 14.1 | 30.7 | 152 |
| 3d | | Cyclonox LE50 | 18.8 | 44.4 | 84 |
| 3e | Propyl gallate | Butanox M50 | 21.9 | 44.6 | 123 |
| 3f | | Trigonox 21 | 14.5 | 25.8 | 160 |
| 3g | | Trigonox C | 15.1 | 27.7 | 169 |
| 3h | | Cyclonox LE50 | 27.1 | 48.2 | 99 |
| 3i | | Hydrogen peroxide | 9.8 | 20.5 | 54 |

These results demonstrate that various peroxides can be used in the cure system according to the invention.

Example 4a-i

Formulations were prepared based on 450 g of various resins, 50 g styrene, 1.1 g Cu naphtenate solution, 1 g propyl gallate compounds and optionally 0.04 g t-butyl catechol as inhibitor. After stirring for 5 min, 100 g of the mixture was cured at 25° C. using 3% of butanox M50 and the cure was monitored with the gel timer. After 63 days another 100 g of the mixture was cured. The results are shown in table 4.

TABLE 4

| exp | resin | inhibitor | $T_{gel}$ (min) t = 0 | $T_{gel}$ (min) t = 63 days | Gel Time Drift (%) |
|---|---|---|---|---|---|
| 4a | Resin A | N | 18.1 | 24.2 | 34 |
| 4b | | Y | 21.8 | 27.3 | 25 |
| 4c | Palatal P69-02 | N | 43.9 | 48.6 | 11 |
| 4d | | Y | 43.4 | 49.1 | 13 |
| 4e | Palatal P5-01 | N | 66.2 | 65.4 | −1 |
| 4f | | Y | 78.8 | 69.6 | −11 |
| 4g | Palatal P6-01 | N | 32.8 | 33.5 | 2 |
| 4h | | Y | 38.1 | 37.6 | −1 |
| 4i | Daron-XP-45-A-2 | N | 123 | 144 | 17 |
| 4j | | Y | 141 | 159 | 13 |
| 4k | Synolite 8388-N-1 | N | 40 | 42.5 | 5 |
| 4l | | Y | 44.9 | 49 | 9 |

For comparison examples 4b, 4d, 4f and 4 h were repeated using 3 mmol cobalt per kg resin (in the form of cobalt octanoate in sprits instead of the copper naphtenate/propylgallate mixture). The gel time drift after 49 days was: Resin A 52%, Palatal P69-02 50%, Palatal P5-01 115% and Palatal P6 177%.

These examples and the comparative experiments clearly demonstrate that multiple resins can be cured with the system according to the invention. Furthermore the results demonstrate that employing the invention results in resins exhibiting low gel time drift. Moreover these experiments demonstrate that employing the invention still allows resins to be tuned using conventional inhibitors.

Example 5

A formulation was prepared using 100 g resin A, 0.12 g Cu (1.5 mmol/kg), 0.1 g propylgallate (0.95 mmol/kg) and 0.26 g K octanoate (10% in spirits, 6 mmol/kg). After stirring for 5 min, the mixture was cured at 25° C. using 2% of Butanox M50 and the cure was monitored with the gel timer resulting in a gel time of 6 min, peak time of 11.5 min and a peak temperature of 120° C.

Considering the low amounts of copper and propylgallate, this result indicates that the curing can be further accelerated via the addition of a potassium compound.

Examples 6a and b

A formulation was prepared using 100 g Synolite 8388-N-1, 6.60 g styrene, 0.26 g Cu naphtenate (8% Cu), 0.64 g propylgallate solution (20% in 1,2 propylene glycol) and 0.66 g N,N-dimethylacetoacetmide (80% in water). After stirring for 5 min, the mixture was cured at 25° C. using 2% of Butanox M50 and the cure was monitored with the gel timer resulting in a gel time of 23.4 min, peak time of 44.2 min and a peak temperature of 102° C.

A similar example without the N,N-dimethylacetoacetmide resulted in a gel time of 29.2 min.

These examples demonstrate that the curing of the cure system according to the invention can be further accelerated using an acetoacetamide.

Example 7

A formulation was prepared using 1000 g Synolite 8388-N-1, 66 g styrene, 2.66 g Cu naphtenate (8% Cu), 6.39 g propylgallate solution (20% in 1,2 propylene glycol) and 6.39 g N,N-diethylacetoacetmide. After stirring for 5 min, 100 g of this mixture was cured at 25° C. using 2% of Butanox M50 and the cure was monitored with the gel timer resulting in a gel time of 32.8 min.

After 135 days another 100 g was cured using 2% Butanox M-50 resulting in a gel time of 31.2 min. The corresponding gel time drift after 135 days of storage was only −5%.

The invention claimed is:

1. A pre-accelerated resin composition comprising an unsaturated polyester resin and/or a vinyl ester resin, wherein the composition further comprises:
   (a) a copper salt which is present in an amount of more than 0.1 mmol/kg resin, and
   (b) a compound according to formula 1

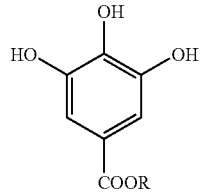

(1)

in which R can be selected from H, $C_1$-$C_{20}$ alkyl, and $C_6$-$C_{20}$ aryl, wherein pre-acceleration of the resin composition is effected by the presence of the copper salt and the compound according to formula (1) in the resin composition.

2. The resin composition according to claim 1, wherein the copper salt is a copper carboxylate.

3. The resin composition according to claim 1, wherein the copper is present in an amount less than 1000 mmol/kg resin.

4. The resin composition according to claim 1, wherein the compound according to formula 1 is present in an amount of at least 0.1 mmol/kg resin.

5. The resin composition according to claim 1, wherein the compound according to formula 1 is present in an amount less than 1000 mmol/kg resin.

6. The resin composition according to claim 1, wherein the molar ratio between the copper and the compound according to formula 1 is between 30:1 to 1:100.

7. The resin composition according to claim 1, wherein the composition further comprises a potassium compound.

8. The resin composition according to claim 1, wherein the resin composition further comprises an acetoacetamide compound having the following formula:

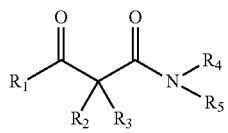

(2)

wherein
$R^1$, $R^2$, $R^3$, $R^4$ and $R^5$ each individually may represent hydrogen (H), or a $C_1$-$C_{20}$ alkyl, $C_6$-$C_{20}$ aryl, alkylaryl or arylalkyl group, and optionally may contain one or more hetero-atoms selected from the group consisting of oxygen, phosphor, nitrogen and sulphur atoms and/or substituents; and wherein a ring may be present between $R^1$ and $R^2$, $R^2$ and $R^3$, $R^3$ and $R^5$, and/or between $R^4$ and $R^5$; and wherein $R^4$ and/or $R^5$ may be part of a polymer chain or may be attached to a polymer chain.

9. The resin composition according to claim 1, wherein the composition contains less than 1 mmol Co/kg primary resin system.

10. The resin composition according to claim 1, wherein the composition further comprises a reactive diluent.

11. The resin composition according to claim 1, wherein the resin composition also contains at least one inhibitor selected from the group consisting of phenolic compounds, stable radicals, catechols and phenothiazines.

12. The resin composition according to claim 7, wherein the potassium compound is potassium carboxylate.

13. A two-component composition comprising a first component and a second component, wherein the first component is a resin composition according to claim 1, and the second component comprises a peroxide compound.

14. The two-component composition according to claim 13, wherein the second component comprises a hydroperoxide or a perester.

15. A process for radically curing a resin composition, which comprises performing the curing starting from a two-component composition according to claim 13.

16. The process according to claim 15, the curing is effected at a temperature in the range of from −20 to +200° C.

17. The process according to claim 16, wherein the curing is effected at a temperature in the range of from −20 to +100° C.

18. The process according to claim 16, wherein the curing is effected at a temperature in the range of from −10 to +40° C.

19. Objects or structural parts obtained from a two component composition according to claim 13.

* * * * *